United States Patent
Vlaznev et al.

(10) Patent No.: US 9,665,714 B1
(45) Date of Patent: May 30, 2017

(54) SYSTEM AND METHOD OF DETECTING MALICIOUS FILES ON VIRTUAL MACHINES IN A DISTRIBUTED NETWORK

(71) Applicant: AO Kaspersky Lab, Moscow (RU)

(72) Inventors: Denis O. Vlaznev, Moscow (RU);
Nikita M. Voitov, Moscow (RU);
Maxim A. Vasilyev, Moscow (RU);
Maxim E. Naumov, Moscow (RU);
Evgeny S. Semenov, Moscow (RU);
Alexander Y. Onishchenko, Moscow (RU)

(73) Assignee: AO Kaspersky Lab, Moscow (RU)

(*) Notice: Subject to any disclaimer, the term of this patent is extended or adjusted under 35 U.S.C. 154(b) by 0 days.

(21) Appl. No.: 15/168,305

(22) Filed: May 31, 2016

(51) Int. Cl.
*G06F 21/00* (2013.01)
*G06F 21/56* (2013.01)
*G06F 21/55* (2013.01)

(52) U.S. Cl.
CPC ............ *G06F 21/56* (2013.01); *G06F 21/552* (2013.01); *G06F 2221/034* (2013.01)

(58) Field of Classification Search
CPC combination set(s) only.
See application file for complete search history.

(56) References Cited

U.S. PATENT DOCUMENTS

| | | | |
|---|---|---|---|
| 8,370,943 B1 | 2/2013 | Dongre et al. | |
| 8,479,294 B1 * | 7/2013 | Li | G06F 21/56 726/23 |
| 8,782,174 B1 * | 7/2014 | Dotan | G06F 21/566 709/219 |
| 8,875,294 B2 | 10/2014 | Golavanov | |
| 8,990,946 B1 | 3/2015 | Yarykin et al. | |
| 2005/0149749 A1 | 7/2005 | Van Brabant | |
| 2007/0214267 A1 | 9/2007 | Ogura et al. | |
| 2012/0144489 A1 | 6/2012 | Jarrett et al. | |
| 2012/0192276 A1 | 7/2012 | Andrews et al. | |

OTHER PUBLICATIONS

Extended European Search Report and Search Opinion for EP 16 19 5890, dated Apr. 6, 2017.

* cited by examiner

*Primary Examiner* — Ghazal Shehni
(74) *Attorney, Agent, or Firm* — Michael Fainberg; Arent Fox LLP (57) ABSTRACT

A method and system is provided for detecting malicious files on a virtual machine in a distributed network. An example method includes, receiving, by a thin client operating on the virtual machine, data relating to characteristics of computing resources of servers in the distributed network with each server being able to scan files to detect malicious files. The method for includes obtaining a on the virtual machine, identifying and selecting, using the data relating to characteristics of the computing resources, one of the servers to perform the scan of the file on the virtual machine, and transmitting to the selected server the file for scanning.

17 Claims, 3 Drawing Sheets

SYSTEM AND METHOD OF DETECTING MALICIOUS FILES ON VIRTUAL MACHINES IN A DISTRIBUTED NETWORK

FIELD OF TECHNOLOGY

The disclosure herein generally related to antivirus technologies, and more particularly, to systems and methods of detecting malicious files on a virtual machines in a distributed network.

BACKGROUND

The rapid development in the recent decade of computer technologies, including cloud technologies, and the widespread use of different kinds of computing devices (personal computers, notebooks, tablets, smartphones, and so on) has served as a powerful stimulus for the use of these devices in every possible sphere of human activity and for a huge number of tasks (from Internet surfing and Internet communication to bank transfers and electronic document distribution). In parallel with the growth in the number of computing devices, the volume of software working on these devices has also grown at a fast pace, including illegal software and malicious programs.

At present, there exists a huge number of malicious program varieties. Some of them steal personal and confidential data from users' devices (such as logins and passwords, banking information, electronic documents). Others form so-called botnets to retrieve passwords from users' devices by the method of brute force, or launch attacks such as denials of service (DDOS) to other computers or computer networks. Further malicious programs sign users up for paid content through aggressive advertising, paid subscriptions, sending of SMSs to paid phone numbers, and so on.

Antivirus programs are used to deal with malicious programs. Dealing effectively with malicious programs requires first of all a timely detection of files containing code of malicious programs, for which the antivirus programs employ various technologies such as signature, heuristic, and proactive analysis, white and black lists, and so on. Each of the aforementioned technologies has its own effectiveness for detecting malicious files, consisting of the potential ability to detect certain kinds of malicious files and requirements for the computing resources of the computer system on which said technologies operate.

Currently, the volumes of data (including files) which are processed by computer systems are so large that their scanning for maliciousness by antivirus programs may take a substantial amount of time and require significant computing resources, which is especially critical for users of personal computers. Therefore, to increase the effectiveness of detecting malicious files one uses in particular methods of increasing the computing resources of computer systems on which a search for malicious files is being done. For this purpose, one uses distributed systems to search for malicious files, consisting of several servers, on each of which a scanning is done for only some of the files needing to be scanned.

Although the known work methods deal well with the tasks of a distributed scanning of files for maliciousness, they are often of no help when there is a heavy workload on the computer systems performing the scanning of files for maliciousness or when there is a malfunction in the work of certain computer systems taking part in the scanning of files for maliciousness.

SUMMARY

The method and system disclosed herein makes it possible to solve the problem of detecting malicious files on a distributed system of protected virtual machines. According to another exemplary aspect, the method and system is designed for the distribution of files for a scanning for maliciousness among "protecting virtual machines".

Specifically, a method is disclose for detecting malicious files on a virtual machine in a distributed network. According to this aspect, the method includes receiving, by a thin client operating on the virtual machine, data relating to characteristics of computing resources of a plurality of servers in the distributed network, where each of the plurality of servers is configured to detect malicious files; obtaining, by the thin client, at least one file on the virtual machine to be scanned for malicious software; identifying and selecting, by the thin client using the data relating to characteristics of the computing resources of the plurality of servers, one of the plurality of servers to perform the scan of the at least one file on the virtual machine; and transmitting, by the thin client, to the selected server the at least one file on the virtual machine to be scanned by the selected server to detect malicious software.

According to another aspect, the method includes placing, by the selected server, the at least one file in a queue of a plurality of files to be scanned for malicious software; and selecting, by the selected server, one of the plurality of files to be scanned if the one file satisfies a criterion of readiness to be scanned for malicious software.

According to another aspect, the criterion of readiness to be scanned includes a condition that the file to be scanned has not been previously scanned and that the selected server has sufficient computing resources to scan the one file to detect malicious software.

According to another aspect, the identifying of the one server further comprises determining a speed of performance by each of the plurality of servers by at least one of: measuring a central tendency of time spent by a plurality of files in a queue of each of the plurality of servers before being scanned for malicious software; measuring a central tendency of total time elapsed between obtaining files from the virtual machine and scanning the files for malicious software from each of the plurality of servers; measuring a central tendency of speed of filling the queue of each of the plurality of servers; and measuring a central tendency of speed of use of each of the plurality of servers to protect the virtual machine.

According to another aspect, the method includes the selecting of the one server is based on the determined speed of performance of each of the plurality of servers and comprises at least one of: selecting, by the thin client, the one server with a highest speed of performance to scan the file for malicious software; selecting, by the thin client, the one server having a speed of performance to scan the file for malicious software if the speed is higher than a given threshold value; selecting, by the thin client, the one server with a smallest size of the queue for files to be scanned for malicious software; and selecting, by the thin client, the one server having the queue for files to be scanned for malicious software that is lower than a given threshold value.

According to another aspect, the method include distributing, by each of the plurality of servers, the data relating to characteristics of computing resources of the plurality of servers, respectively, over the distributed network so that a plurality of thin clients can access the data.

According to another aspect, the method includes the distributing the data comprises at least one of routing the data by a broadcasting channel and multicasting the data to the plurality of thin clients.

According to another aspect, a system is provided for detecting malicious files on a plurality of virtual machines in a distributed network. According to an exemplary aspect, the system includes a plurality of servers configured to scan files for malicious software and to distribute, over the distributed network, data relating to characteristics of computing resources of the respective server; and at least one thin client operating on a virtual machine of the plurality of virtual machines, the at least one thin client being configured to: receive the data relating to characteristics of computing resources from each of the plurality of servers in the distributed network, obtain at least one file on the virtual machine to be scanned for malicious software, identify and select, using the data relating to characteristics of the computing resources of the plurality of servers, one of the plurality of servers to perform the scan of the at least one file on the virtual machine, and transmit to the selected server the at least one file on the virtual machine, wherein the selected server scans the at least one file received from the at least one thin client to detect malicious software.

According to another aspect, a thin client host operating on a virtual machine is disclosed for protecting the virtual machine from malicious software. According to this aspect, the thin client includes a processor configured to: receive data relating to characteristics of computing resources of a plurality of servers in a distributed network, where each of the plurality of servers is configured to detect malicious files, obtain at least one file on the virtual machine to be scanned for malicious software, identify and select, using the data relating to characteristics of the computing resources of the plurality of servers, one of the plurality of servers to perform the scan of the at least one file on the virtual machine, and transmit to the selected server the at least one file on the virtual machine to be scanned by the selected server to detect malicious software.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for detecting malicious files on a virtual machines in a distributed network. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The disclosure herein provides a number of definitions and concepts that are employed to facilitate the explanation of the variant aspects. It should be appreciated that the following definitions are provided for purposes of the exemplary aspects.

"Protected virtual machine" is a virtual machine working under the control of a hypervisor, with an installed guest operating system, in the computational environment of which a thin client component operates.

"Protecting virtual machine" is a virtual machine working under the control of a hypervisor, with an installed operating system, in the computational environment of which a protection server component operates.

"Thin client" is software intended to protect a "protected virtual machine" against malicious programs and computer threats and to transfer files for a scan for maliciousness through a network of "protecting virtual machines". In general, the term "thin client" is used herein to described a client machine that relies on the server to perform the data processing and computational roles, as would be understood to one skilled in the art. According to an exemplary aspect, either a dedicated thin client terminal or a regular PC with thin client software (e.g., operating within a virtual machine of the client terminal) is used to send keyboard and mouse input to the server and receive screen output in return. According to one aspect, the thin client may not process any data, but only process the user interface (UI). The benefits are improved maintenance and security due to central administration of the hardware and software in the datacenter. As the disclosure herein refers to a "thin client", it should be understood that the exemplary thin client may generally include hardware, such as a computer terminal which provides I/O for a keyboard, mouse, monitor, jacks for sound peripherals, and open ports for USB devices, e.g. printer, flash drive, web cam, card reader, smartphone, etc. Moreover, the exemplary thin client may also include legacy serial and/or parallel ports to support older devices such as receipt printers, scales, time clocks, etc. Thin client software typically consists of a GUI (graphical user interface), cloud access agents (e.g. RDP, ICA, PCoIP), a local web browser, terminal emulations (in some cases), and a basic set of local utilities.

"Protection server" is software intended to perform a scan for maliciousness of files received from the "protected virtual machines".

Figure 1:
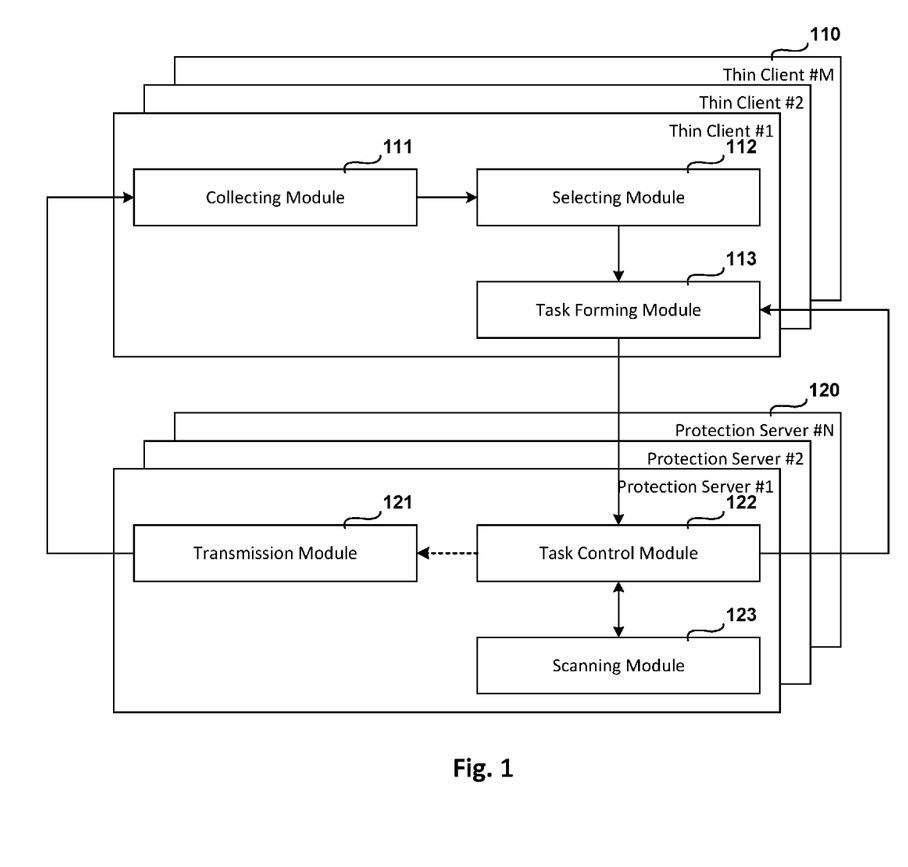
FIG. 1 shows a block diagram of the system for detecting malicious files on protected virtual machines according to an exemplary aspect.

FIG. 1 shows a block diagram of a system for detecting malicious files on protected virtual machines according to an exemplary aspect.

The system for detecting malicious files on protected virtual machines includes a thin client 110, a collecting module 111, a selecting module 112, a task forming module 113, a protection server 120, a transmission module 121, a task control module 122 and a scanning module 123. It should be appreciated that the collecting module 111, the selecting module 112, and the task forming module 113 all can be provided as a single or plurality of modules for the thin client 110, each of which can perform the algorithms described herein. Similarly, the transmission module 121, the task control module 122 and the scanning module 123 all can be provided as a single or plurality of modules for the protection server 120, each of which can perform the algorithms described herein. Moreover, it is noted that the term module as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device.

According to the exemplary aspect, the thin client 110 is designed to protect the protected virtual machine against malicious programs and computer threats and contains the collecting module 111, the selecting module 112, and the task forming module 113.

According to the exemplary aspect, the collecting module 111, which is part of the thin client 110, is configured to perform the following functions:
    intercept, by a driver of the computer network, information containing the characteristics of the computing resources of the protection servers 120, which is distributed by the transmission module 121 throughout the computer network,
    and transmit the intercepted information to the selecting module 112;

According to the exemplary aspect, the characteristics of the computing resources of the protection server 120 can be, for example:
    the time files spend in the task waiting queue of the protection server 120;
    the time elapsed between the receiving of files from the task forming module 113 and the pronouncing of a verdict by the scanning module 123;
    the size of the task waiting queue of the protection server 120;
    the computing power of the protecting virtual machine on which the protection server 120 is working.

The collecting module 111, which is part of the thin client 110 working on a protected virtual machine, can intercept information containing the characteristics of the computing resources of the protection server, 120, which is transmitted by the transmission module 121 being part of the protection server, to the collecting module 111 which is part of a thin client 110 working on another protected virtual machine.

According to the exemplary aspect, the selecting module 112 which is part of the thin client 110 is configured to perform the following functions:
    calculate the speed of performance of the antivirus scan of each protection server 120 whose computing resource characteristics are contained in the information received from the collecting module 111,
    select the protection servers 120 on the basis of an analysis of the calculated speed of performance of the scan for maliciousness,
    and transmit information on each selected protection server 120 to the task forming module 113, where the information transmitted contains at least unique identifiers of the protection servers 120.

According to the exemplary aspect, the speed of performance of the scan for maliciousness of the protection server 120 can be based on one or more of the following:
    the measure of central tendency of the time spent by the files in the task waiting queue of the protection server;
    the measure of central tendency of the time elapsed between the receiving of files from the task forming module 113 and the pronouncing of a verdict by the scanning module 123;
    the measure of central tendency of the speed of filling the task waiting queue of the protection server 120;
    the measure of central tendency of the speed of use of the computing power of the protecting virtual machine on which the protection server 120 is working.

The speed of performing the scan for maliciousness of the protection server 120 can be calculated by all of the above described methods with the use of probabilistic techniques making a prediction of the speed of performance of the scan for maliciousness of the protection server 120 by each protecting virtual machine in the selected period of time.

For the transmission to the task forming module 113, one can select the protection server 120 based on or more of the following criteria:
    the highest calculated speed of performance of the scan for maliciousness;
    a calculated speed of performance of the scan for maliciousness which is higher than a given threshold value;
    a minimal size of the task waiting queue of the protection server;
    a size of the task waiting queue of the protection server which is lower than a given threshold value.

According to the exemplary aspect, the task forming module 113 which is part of the thin client 110 is configured to perform the following functions:
    receive files of the virtual machine on which said thin client 110 is working to perform the scan for maliciousness;
    and transmit the received files to the task control module 122 of the protection server 120 whose information was received from the selecting module 112;

The protection server 120 is designed to perform a scan for maliciousness of the files received from the thin clients 110 of the protected virtual machines and it contains the transmission module 121, the task control module 122, and the scanning module 123.

According to the exemplary aspect, the transmission module 121 which is part of the protection server 120 is configured to perform the following functions:
    determine the characteristics of the computing resources of the protection server 120;
    and distribute throughout the computer network the information containing the determined characteristics;

According to the exemplary aspect, the distribution by the transmission module 121 throughout the computer network of the information containing the characteristics of the computing resources of the protection server 120 as determined by the transmission module 121 can be done based on one or more of the following techniques:
    routing by broadcasting channel;
    multi-address broadcasting (multicasting);
    direct transmission to the collecting module 111 to at least one thin client 110.

According to the exemplary aspect, the task control module 122 which is part of the protection server 120 is configured to perform the following functions:

organize the workload of the task waiting queue, which is a list containing files received from the task forming module 113 of at least one thin client 110, the task waiting queue being designed to: (1) place the files received from the task forming module 113 of the thin clients 110 in a task waiting queue, and/or (2) select files from the task waiting queue for transfer to the scanning module 123 to perform the scan for maliciousness, select from the task waiting queue the files meeting the criterion of readiness for the scan for maliciousness by the scanning module 123, where the criterion of readiness can be the condition that: (1) the scanning module 123 at the time of the selection is not performing a scan for maliciousness of the files previously sent to the scanning module 123, and/or (2) the scanning module 123 has sufficient computing resources to handle the files selected, and transmit the files selected from the task waiting queue to the scanning module 123 to perform the scan for maliciousness.

According to the exemplary aspect, the scanning module 123 which is part of the protection server 120 is configured to perform the following functions:

perform the scan for maliciousness of the files received from the task control module 122; and/or pronounce a verdict on the detection of a malicious file in the event of detecting malicious files as a result of the performed scan for maliciousness.

The operation of the system for detecting of malicious files on protected virtual machines should be considered by the example of a scan for maliciousness of 1000 files stored on 10 protected virtual machines (100 on each protected virtual machine) by the resources of 2 protecting virtual machines.

On each of the 10 protected virtual machines, a thin client 110 takes one file at a time from the group of 100 files which need to be scanned for maliciousness. The collecting module 111 which is part of the thin client 110 of each protected virtual machine intercepts with the help of a specialized driver the characteristics of the computing resources of the protection servers 120 of the protecting virtual machines previously sent by the transmission module 121 of the protection server of each of the two available protecting virtual machines, after which it sends them to the selecting module 112. The characteristics of the computing resources of protection server #1 120 and protection server #2 120 can be varied (depending on both the protecting virtual machines themselves and the settings of the protection servers): the time the files spend in the task waiting queue of the scan for maliciousness of protection server #1 120, the computing power of protecting virtual machine #1 on which protection server #1 120 is working (i.e., the available RAM, the speed of the central processor, and so on), and the size of the task waiting queue of the scan for maliciousness of the protection server #2 120, respectively.

On the basis of the intercepted characteristics of the computing resources of protection server #1 120 and protection server #2 120, the selecting module 112 which is part of the thin client of each protected virtual machine independently of the other selecting module 112 calculates the arithmetic mean of the time elapsed between the receiving of the files from the task forming module 113 and the pronouncing of a verdict by the scanning module 123, which is the speed of performance of the scan for maliciousness of the protection servers #1 and #2 120. Of the two protection servers, the protection server with the highest calculated speed of performance of the scan for maliciousness is selected (#2), after which the result is sent to the task forming module 113, since the minimal calculating speed of performing the scan for maliciousness (#1) means that the protection server #1 120 is at present burdened with other scanning tasks or the protecting virtual machine does not have the required computing resources to perform the scanning of the files for maliciousness.

The task forming module 113 which is part of the thin client 110 requests from the thin client 110 the next file for scanning for maliciousness. The file obtained is sent to the task control module 122 of the selected protection server (#2) 120.

The task control module 122 which is part of the protection server #2 120 places the file received from the task forming module 113 of the thin client of each protected virtual machine in the task waiting queue of the scan for maliciousness. The waiting queue may already contain files received from the task forming module 113 of the thin clients of other protected virtual machines. For as long as the scanning module 123 which is part of the protection server #2 120 is occupied with tasks of scanning files for maliciousness, the task waiting queue of the scan for maliciousness simply builds up, i.e., the files arriving from the task forming module 113 of the thin client of the protected virtual machines are placed in the task waiting queue of the scan for maliciousness, but are not taken out of it and are not sent for subsequent processing to the scanning module 123. The task control module 122 regularly determines the possibility of the scanning module 123 performing the scanning of the files for maliciousness. After the scanning module 123 completes the performance of the previous tasks, the task control module 122 takes from the task waiting queue of the scan for maliciousness the next batch of files, containing one or more files, and sends the files to the scanning module 123.

The scanning module 123 performs the scan for maliciousness of the files received from the task control module 122 and pronounces a verdict as to whether or not the files received are malicious. After completing the scan, the scanning module 123 transmits the information on completion of the processing of the files received, and also the results of the scan to the task control module 122.

During the working of the protection server #2 120, the thin clients 110 of the protected virtual machines do not stand idle. During the working of the protection server #2 120, protection server #1 120 can be freed up. In this case, the next time the performance of the scan for maliciousness is calculated it will become larger for protection server #1 120 than for protection server #2 120 and the next batch of the 990 files remaining for scanning (99 on each protected virtual machine) will be sent to the task control module 122 of the protection server #2 120.

Figure 2:
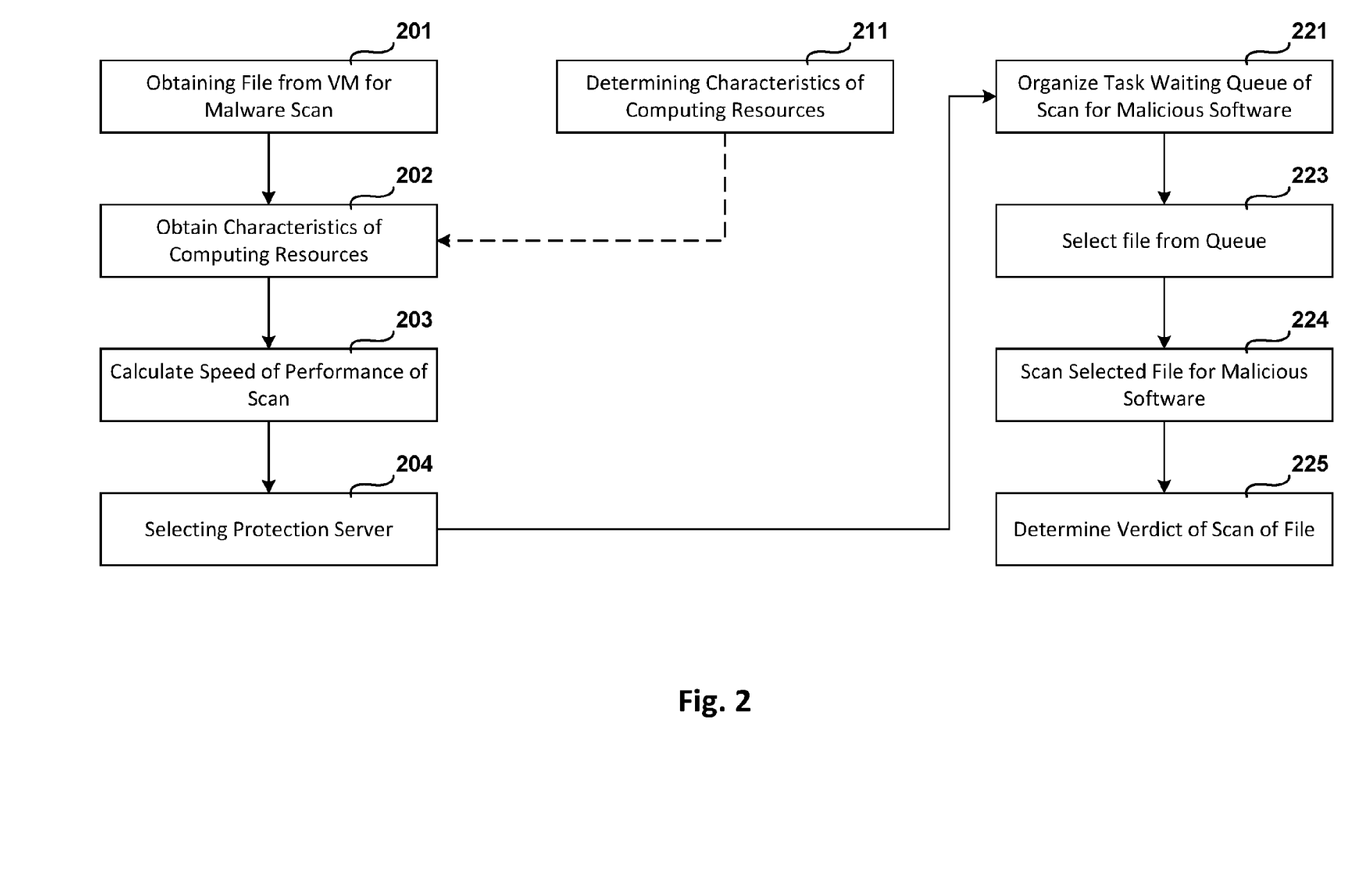
FIG. 2 shows an exemplary flowchart for a method for detecting malicious files on protected virtual machines according to an exemplary aspect.

FIG. 2 shows an exemplary flowchart for a method for detecting malicious files on protected virtual machines according to an exemplary aspect.

According to the exemplary aspect, the method for detecting malicious files on protected virtual machines includes a step 201 in which files are requested for performance of a scan for maliciousness, a step 202 in which the characteristics of the computing resources of the protection servers 120 are intercepted, a step 203 in which the speed of performance of the scan for maliciousness by the protection servers 120 is calculated, a step 204 in which the protection servers 120 are selected, a step 211 in which the characteristics of the computing resources are determined, a step 221 in which a task waiting queue of the scan for maliciousness is organized, a step 223 in which files are selected from the task waiting queue of the scan for maliciousness, a step 224 in which the scan for maliciousness is performed, and a step 225 in which a verdict is pronounced as to the detection of malicious files.

Specifically, as shown, in step 201 files are received from the virtual machine on which the aforesaid thin client 110 is working to perform the scan for maliciousness.

In step 211 the characteristics of the computing resources of the protection servers 120 are determined and information containing the determined characteristics is distributed throughout the computer network.

The distribution by the transmission module 121 throughout the computer network of the information containing the characteristics of the computing resources of the protection server 120 as determined by the transmission module 121 can be done with the use of one or more of the following:
routing by broadcasting channel;
multi-address broadcasting (multicasting); and/or
direct transmission to the collecting module 111 to at least one thin client 110.

The characteristics of the computing resources of the protection server 120 can be one or more of the following:
the time files spend in the task waiting queue of the protection server 120;
the time elapsed between the receiving of files from the task forming module 113 in step 201 and the pronouncing of a verdict by the scanning module 123 in step 225;
the size of the task waiting queue of the protection server 120; and/or
the computing power of the protecting virtual machine on which the protection server 120 is working.

In step 202 a driver of the computer network intercepts the information containing the characteristics of the computing resources of the protection servers 120 as determined in step 211.

The collecting module 111 which is part of the thin client 110 working on a protected virtual machine can intercept information containing the characteristics of the computing resources of the protection server 120 that was transmitted in step 211 by the transmission module 121 which is part of the protection server to the collecting module 111 which is part of the thin client 110 working on another protected virtual machine.

In step 203 the speeds of performance of the scan for maliciousness are calculated for each protection server 120 whose characteristics of computing resources are contained in the information intercepted in step 202.

The speed of performance of the scan for maliciousness of the protection server 120 can be based on one or more of the following:
the measure of central tendency of the time spent by the files in the task waiting queue of the protection server;
the measure of central tendency of the time elapsed between the receiving of files from the task forming module 113 in step 201 and the pronouncing of a verdict by the scanning module 123 in step 225;
the measure of central tendency of the speed of filling the task waiting queue of the protection server 120; and/or
the measure of central tendency of the speed of use of the computing power of the protecting virtual machine on which the protection server 120 is working.

The speed of performing the scan for maliciousness of the protection server 120 can be calculated by all of the above described methods with the use of probabilistic methods making a prediction of the speed of performance of the scan for maliciousness of the protection server 120 by each protecting virtual machine in the selected period of time.

In step 204 the protection servers 120 are selected on the basis of the analysis of the speed of performance of the scan for maliciousness as calculated in step 203.

For the transmission to the task forming module 113, the method can select the protection server 120 with one or more of the following criteria:
the highest speed of performance of the scan for maliciousness as calculated in step 203;
a speed of performance of the scan for maliciousness as calculated in step 203 which is higher than a given threshold value;
a minimal size of the task waiting queue of the protection server; and/or
a size of the task waiting queue of the protection server which is lower than a given threshold value.

In step 221 the task waiting queue of the scan for maliciousness is organized, being a list containing the files received in step 201 and configured to perform the following functions:
place the files obtained from the task forming module 113 in the task waiting queue of the scan for maliciousness, and
select files from the task waiting queue of the scan for maliciousness for transmission to the scanning module 123 for performance of the scan for maliciousness.

In step 223 the files are selected from the task waiting queue which satisfy the criterion of readiness for the scan for maliciousness by the scanning module 123, where the criterion of readiness can be one or more of the following conditions:
the scanning module 123 at the time of the selection is not performing a scan for maliciousness of the files previously sent to the scanning module;
the scanning module 123 has sufficient computing resources to handle the files selected.

In step 224 the scan for maliciousness of the file selected in step 223 is performed according to existing file scanning techniques, for example, such as signature-based detection, heuristics, rootkit detection and the like.

Finally, in step 225 a verdict is pronounced as to the detecting of malicious files in event of detecting malicious files as a result of the scan for maliciousness performed in step 224. According to one aspect, this verdict may then be transmitted back to thin client 110, which, in turn, can either process the file (if the verdict revealed no malicious software) or remove/quarantine the file (if the verdict revealed malicious software).

Figure 3:
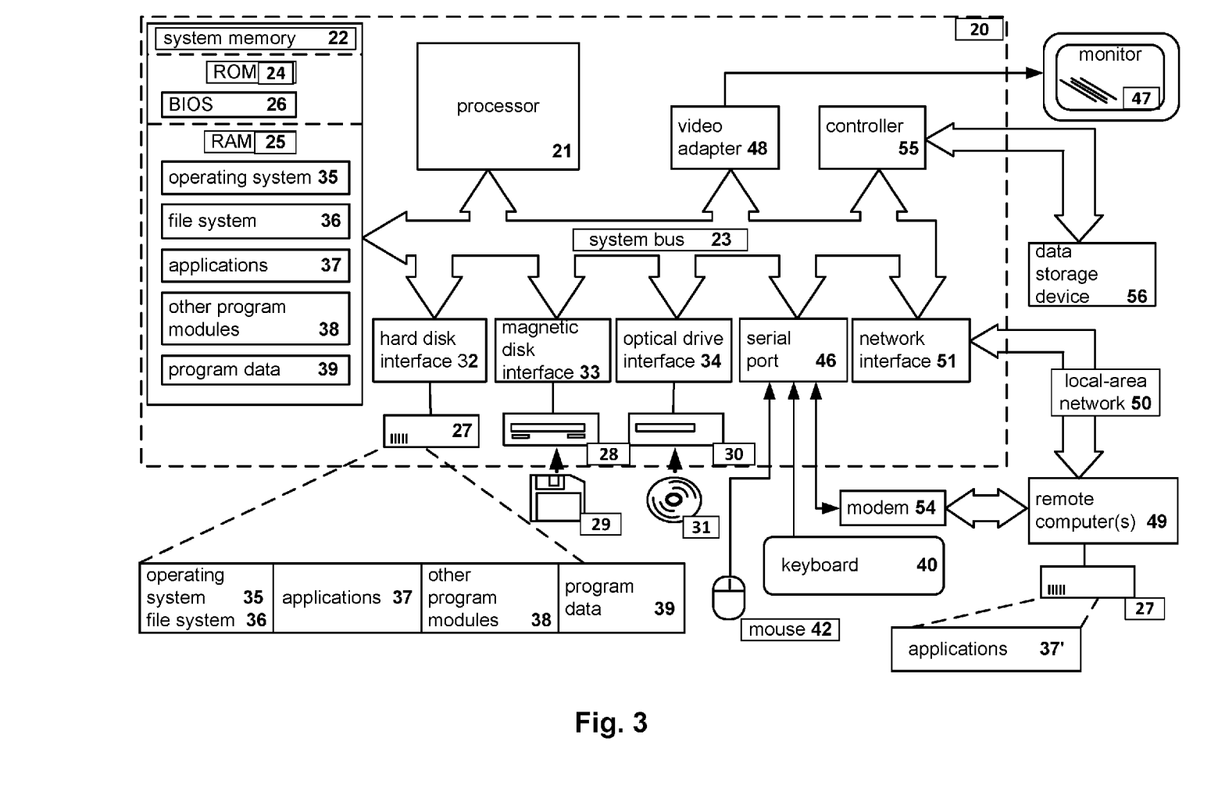
FIG. 3 illustrates an example of a general-purpose computer system on which the disclosed systems and method can be implemented.

FIG. 3 illustrates an example of a general-purpose computer system (which may be a personal computer or a server) on which the disclosed systems and method can be implemented according to an example aspect. For example, the computer system 20 can correspond to one or more of protections servers 120 or thin clients 110. As shown, the computer system 20 may include a central processing unit 21 (although not for the thin client 110), a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

As noted above, in various aspects, the systems and methods described in the present disclosure in terms of modules. It is reiterates that the term module as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any example implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malicious files on a virtual machine in a distributed network, the method comprising:
receiving, by a thin client operating on the virtual machine, data relating to characteristics of computing resources of a plurality of servers in the distributed network, where each of said servers is configured to perform malware scan of files;
based on the received data, determining, by the thin client, for each one of the plurality of servers, a speed of performing a malware scan based on a measure of central tendency of at least one of: time spent by a plurality of files in a queue of each server before being scanned for malware, speed of filling the queue of each server, total time elapsed between obtaining a file from the virtual machine and scanning of said file for malware by each of said servers, and speed of use of computing power of each of the said servers;
obtaining, by the thin client, at least one file on the virtual machine to be scanned for malicious software;
selecting, by the thin client, based on the determined speed of performing a malware scan of each server, one of the plurality of servers to perform the malware scan of the at least one file; and
transmitting, by the thin client, to the selected server the at least one file to be scanned by the selected server for malware.

2. The method of claim 1, further comprising:
placing, by the selected server, the at least one file in a queue of a plurality of files to be scanned for malicious software; and
selecting, by the selected server, one of the plurality of files to be scanned if the one file satisfies a criterion of readiness to be scanned for malicious software.

3. The method of claim 2, wherein the criterion of readiness to be scanned includes a condition that the file to be scanned has not been previously scanned and that the selected server has sufficient computing resources to scan the one file to detect malicious software.

4. The method of claim 1, wherein the selecting of the one server is based on the determined speed of performance of each of the plurality of servers and comprises at least one of:
selecting, by the thin client, the one server with a highest speed of performance to scan the file for malicious software;
selecting, by the thin client, the one server having a speed of performance to scan the file for malicious software if the speed is higher than a given threshold value;
selecting, by the thin client, the one server with a smallest size of the queue for files to be scanned for malicious software; and
selecting, by the thin client, the one server having the queue for files to be scanned for malicious software that is lower than a given threshold value.

5. The method of claim 1, further comprising distributing, by each of the plurality of servers, the data relating to characteristics of computing resources of the plurality of servers, respectively, over the distributed network so that a plurality of thin clients can access the data.

6. The method of claim 5, wherein the distributing the data comprises at least one of routing the data by a broadcasting channel and multicasting the data to the plurality of thin clients.

7. A system for detecting malicious files on a plurality of virtual machines in a distributed network, the system comprising:
a plurality of servers configured to scan files for malicious software and to distribute, over the network, data relating to characteristics of computing resources of the respective server; and
at least one thin client operating on a virtual machine of the plurality of virtual machines, the at least one thin client being configured to:
receive the data relating to characteristics of computing resources from each of the plurality of servers in the distributed network,
based on the received data, determine for each one of the plurality of servers, a speed of performing a malware scan based on a measure of central tendency of at least one of: time spent by a plurality of files in a queue of each server before being scanned for malware, speed of filling the queue of each server, total time elapsed between obtaining a file from the virtual machine and scanning of said file for malware by each of said servers, and speed of use of computing power of each of the said servers;
obtain at least one file on the virtual machine to be scanned for malicious software,
select based on the determined speed of performing a malware scan of each server, one of the plurality of servers to perform the malware scan of the at least one file; and
transmit to the selected server the at least one file for malware scanning.

8. The system of claim 7, wherein the selected server is further configured to:
place the at least one file in a queue of a plurality of files to be scanned for malicious software; and
select one of the plurality of files to be scanned if the one file satisfies a criterion of readiness to be scanned for malicious software.

9. The system of claim 8, wherein the criterion of readiness to be scanned includes a condition that the file to be scanned has not been previously scanned and that the selected server has sufficient computing resources to scan the one file to detect malicious software.

10. The system of claim 7, wherein the at least one thin client is configured to select the one server based on the determined speed of performance of each of the plurality of servers and includes at least one of:
selecting the one server with a highest speed of performance to scan the file for malicious software;
selecting the one server having a speed of performance to scan the file for malicious software if the speed is higher than a given threshold value;
selecting the one server with a smallest size of the queue for files to be scanned for malicious software; and
selecting the one server having the queue for files to be scanned for malicious software that is lower than a given threshold value.

11. The system of claim 7, wherein each of the plurality of servers is configured to distribute the data by at least one of routing the data by a broadcasting channel and multicasting the data to the plurality of thin clients.

12. A thin client host operating on a virtual machine for protecting the virtual machine from malicious software, the thin client comprising:
a processor configured to:
receive data relating to characteristics of computing resources of a plurality of servers in the distributed network, where each of said servers is configured to perform malware scan of files;

based on the received data, determine for each one of the plurality of servers, a speed of performing a malware scan based on a measure of central tendency of at least one of: time spent by a plurality of files in a queue of each server before being scanned for malware, speed of filling the queue of each server, total time elapsed between obtaining a file from the virtual machine and scanning of said file for malware by each of said servers, and speed of use of computing power of each of the said servers;

obtain at least one file on the virtual machine to be scanned for malicious software;

select based on the determined speed of performing a malware scan of each server, one of the plurality of servers to perform the malware scan of the at least one file; and transmit to the selected server the at least one file to be scanned by the selected server for malware.

13. The thin client host of claim 12, wherein the selected server places the at least one file in a queue of a plurality of files to be scanned for malicious software and selects one of the plurality of files to be scanned if the one file satisfies a criterion of readiness to be scanned for malicious software.

14. The thin client host of claim 13, wherein the criterion of readiness to be scanned includes a condition that the file to be scanned has not been previously scanned and that the selected server has sufficient computing resources to scan the one file to detect malicious software.

15. The thin client host of claim 12, wherein the processor is further configured to select the one server based on the determined speed of performance of each of the plurality of servers by at least one of:

selecting, by the thin client, the one server with a highest speed of performance to scan the file for malicious software;

selecting, by the thin client, the one server having a speed of performance to scan the file for malicious software if the speed is higher than a given threshold value;

selecting, by the thin client, the one server with a smallest size of the queue for files to be scanned for malicious software; and selecting, by the thin client, the one server having the queue for files to be scanned for malicious software that is lower than a given threshold value.

16. The thin client host of claim 12, wherein each of the plurality of servers distributes the data relating to characteristics of computing resources of the plurality of servers, respectively, over the distributed network so that a plurality of thin clients can access the data.

17. The thin client host of claim 16, wherein each of the plurality of servers distributes the data by at least one of routing the data by a broadcasting channel and multicasting the data to the plurality of thin clients.

* * * * *